United States Patent
Becke et al.

[15] 3,668,260
[45] June 6, 1972

[54] SUBSTITUTED TETRACHLOROBENZENES

[72] Inventors: Friedrich Becke, Heidelberg; Adolf Fishcer, Mutterstadt; Helmut Hagen; Guenter Scheuerer, both of Ludwigshafen, all of Germany

[73] Assignee: Badische Anilin- & Soda-Fabrik Aktiengesellschaft, Ludwigshafen/Rhine, Germany

[22] Filed: May 8, 1970

[21] Appl. No.: 35,877

[30] Foreign Application Priority Data

May 14, 1969 Germany.....................P 19 24 530.8

[52] U.S. Cl. ..........................................260/611 A, 71/124
[51] Int. Cl............................................................C07c 43/28
[58] Field of Search ................................................260/611 A

[56] References Cited

UNITED STATES PATENTS

| | | | |
|---|---|---|---|
| 2,564,214 | 8/1951 | Ross et al. | 260/611 A |
| 2,702,825 | 2/1955 | Ross et al. | 260/611 A |
| 2,799,694 | 7/1957 | Ross et al. | 260/611 A |

*Primary Examiner*—Bernard Helfin
*Attorney*—Johnston, Root, O'Keeffe, Keil, Thompson & Shurtleff

[57] ABSTRACT

New and valuable substituted thetrachloro-benzenes having the formula

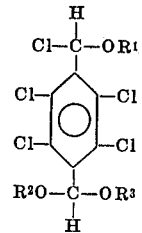

where $R^1$, $R^2$ and $R^3$ are identical or different and each denotes an alkyl radical, herbicides containing these compounds, and a process for controlling the growth of unwanted plants with these compounds.

2 Claims, No Drawings

SUBSTITUTED TETRACHLOROBENZENES

The present invention relates to substituted tetrachlorobenzenes and herbicides containing them.

It is known to use dimethyl tetrachloroterephthalate as a selective herbicide; however, the disadvantage of herbicides containing this compound is that the herbicidal action is not always satisfactory and the selectivity is insufficient.

We have now found that substituted tetrachlorobenzenes having the formula

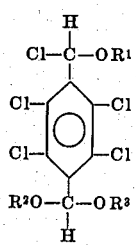

where $R^1$, $R^2$ and $R^3$ are identical or different and each denotes an alkyl radical, especially a lower alkyl radical (methyl, ethyl, propyl, butyl, isopropyl, isobutyl), have a good herbicidal action. An important active ingredient is for example 1-(1'-chloro-1'-methoxy)-methyl-4-bis-(methoxy)-methyl-2,3,5,6-tetrachlorobenzene.

The compounds according to the invention may be prepared in the following manner:

Starting from p-xylene, tetrachloro-p-xylene is prepared by nuclear chlorination which is then chlorinated in the side-chain by exposure to ultra-violet light. 1,4-bis-(dichloromethyl)-2,3,5,6-tetrachlorobenzene is obtained in a yield of more than 90 percent; b.p.: 188° C (2 mm); m.p.: 116° to 118° C. The corresponding alkoxy derivatives may be obtained from this compound by reaction with alcoholates.

Preparation of 1-(1'-chloro-1'-methoxy)-methyl-4-bis-(methoxy)-methyl-2,3,5,6-tetrachlorobenzene:

550 parts (by weight) of a 30 percent by weight methanolic sodium methylate solution is added to a solution of 380 parts of 1,4-bis-(dichloromethyl)-2,3,5,6-tetrachlorobenzene in 500 parts of methanol in a stirred vessel. The reaction mixture is stirred for 10 hours at 60° to 70° C. After the mixture has been allowed to cool, the precipitated sodium chloride is filtered off, the methanol removed by distillation and the residue taken up in ether. The ether phase is washed with water and dried, and the ether distilled off. The residue is fractionally distilled, 305 parts (82 percent of the theory) of 1-(1'-chloro-1'-methoxy)-methyl-4-bis-(methoxy)-methyl-2,3,5,6-tetrachlorobenzene being obtained at 173° C (2 mm).

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C, e.g. tetrahydronaphthalene or alkylated naphthalenes, or organic liquids having boiling points higher than 150° C and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers. It is also possible to add insecticides, fungicides, bactericides, growth regulators and other herbicides.

The following examples illustrate the application of the herbicides according to the invention.

EXAMPLE 1

In a greenhouse, loamy sandy soil is filled into pots and sown with the seeds of Indian corn (Zea mays), cotton (Gossypium sp.), soya bean (Glycine hispida), rice (Oryza sativa), wheat (Triticum sativum), barnyard grass (Echinochloa crus-galli), large crabgrass (Digitaria sanguinalis), annual bluegrass (Poa annua), slender foxtail (Alopecurus myosuroides), and orchard-grass (Dactylis glomerata). The soil is subsequently treated with 3 kg per hectare of 1-(1'-chloro-1'-methoxy)-methyl-4-bis-(methoxy)-methyl-2,3,5,6-tetrachlorobenzene I and, for comparison, with 3 kg per hectare of dimethyl tetrachloroterephthalate II, these amounts of the active ingredients each being dispersed in 500 liters of water per hectare. After 4 to 5 weeks it is ascertained that active ingredient I has a stronger herbicidal action than II. The results of the experiment are given in the following table:

|  | Active ingredient I | II |
|---|---|---|
| Indian corn | 0 | 0 |
| Cotton | 0 | 0 |
| Soya bean | 0 | 0 |
| Rice | 10 | 10–20 |
| Wheat | 0 | 0 |
| Barnyard grass | 100 | 90 |
| Large crabgrass | 80–90 | 80 |
| Annual bluegrass | 90–100 | 70 |
| Slender foxtail | 90–100 | 50–60 |
| Orchardgrass | 90–100 | 70 |

0 = no action
100 = complete destruction

EXAMPLE 2

In a greenhouse, the plants wheat (Triticum sativum), barley (Hordeum vulgare), slender foxtail (Alopecurus myosuroides), silky bent grass (Apera spica venti), annual bluegrass (Poa annua), orchardgrass (Dactylis glomerata), and barnyard grass (Echinochloa crus-galli) are treated at a growth height of 2 to 15 cm with 3 kg per hectare of 1-(1'-chloro-1'-methoxy)-methyl-4-bis-(methoxy)-methyl-2,3,5,6-tetrachlorobenzene I dispersed in 500 liters of water per hectare. After 10 to 14 days the grassy weeds begin to wither, and after 3 to 4 weeks the grassy weeds slender foxtail, silky bent grass, annual bluegrass, orchardgrass and barnyard grass are withered, whereas wheat and barley continue to grow undamaged.

EXAMPLE 3

80 parts by weight of compound I from Example 1 is mixed with 20 parts by weight of N-methyl-α-pyrrolidone. A mixture is obtained which is suitable for application in the form of very fine drops.

EXAMPLE 4

20 parts by weight of compound I from Example 1 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 5

20 parts by weight of compound I from Example 1 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 6

3 parts by weight of compound I from Example 1 is intimately mixed with 97 parts by weight of particulate kaolin. A dust is obtained containing 3 percent by weight of the active ingredient.

EXAMPLE 7

30 parts by weight of compound I from Example 1 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. A substituted tetrachlorobenzene having the formula

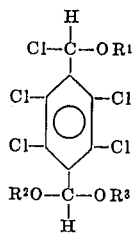

where $R^1$, $R^2$ and $R^3$ are identical or different and each denotes an alkyl radical.

2. 1-(1'-chloro-1'-methoxy)-methyl-4-bis-(methoxy)-methyl-2,3,5,6-tetrachlorobenzene.

* * * * *